United States Patent Office 3,102,906
Patented Sept. 3, 1963

3,102,906
ISOMERIZATION OF AROMATIC POLY-
CARBOXYLIC ACIDS
Robert F. Ruthruff, 18530 Klimm Ave., Homewood, Ill.
No Drawing. Filed Feb. 4, 1960, Ser. No. 6,604
14 Claims. (Cl. 260—515)

This invention relates to the isomerization of aromatic polycarboxylic acids. More particularly, this invention relates to the isomerization of aromatic dicarboxylic acids. In one specific aspect thereof, this invention relates to the isomerization of phthalic acid to terephthalic acid.

As is well known, terephthalic acid is produced by the conversion of reactive para positioned substituents on the benzene ring to carboxyl groups, specifically by the partial oxidation of the methyl groups of p-xylene to carboxyl groups. However, it is extremely difficult to produce p-xylene of the degree of purity required for conversion to terephthalic acid by partial oxidation. Furthermore, the partial oxidation reaction introduces a number of operating problems, it being extremely difficult to steer a course between the Scylla of incomplete reaction and the Charybdis of over oxidation. Finally, the physical properties of the desired terephthalic acid are such as to circumscribe the choice of operating procedures suitable for its production (e.g., it is necessary to employ inconvenient liquid phase techniques in the partial oxidation reaction) and also recovery from the reaction mixture of the terephthalic acid produced is very difficult.

In contrast, phthalic acid (in the form of phthalic anhydride) is produced with comparative ease by the partial oxidation of either of two readily available raw materials. Phthalic anhydride is produced by the partial oxidation of either naphthalene or o-xylene, this latter compound being obtained with comparative ease by accurate fractionation of suitable petroleum stocks. Phthalic acid readily forms an anhydride which, being a highly volatile compound, makes possible the employment of convenient vapor phase operating techniques in the partial oxidation reaction. The required reaction conditions for the partial oxidation reaction are not too critical and the production of the desired phthalic anhydride in high yields is a routine commercial procedure. The volatility of the phthalic anhydride simplifies the recovery thereof from the final reaction mixture and also facilitates the purification of the resulting crude product which is easily accomplished by a simple distillation operation conducted under moderate vacuum.

Because of the low cost and ready availability of phthalic acid (in the form of its anhydride), efforts have been made to isomerize phthalic acid to terephthalic acid. This has usually involved the heating of an alkali metal phthalate to rather elevated temperatures in the presence of a high partial pressure of carbon dioxide. Catalysts, such as finely divided cadmium or zinc or compounds of these metals, may be present if desired. To achieve an even moderately rapid rate of reaction a high operating temperature must be employed, usually 400–450° C. or even higher and even so, reaction periods of six hours or more are usually required. Because of the severe operating conditions required, considerable decarboxylation of the alkali metal phthalate with the production of benzoic acid and benzene occurs even though the reaction vessel is provided with carbon dioxide at a pressure ranging from about 70 atmospheres to 250 atmospheres or even more. These high operating pressures, especially when coupled with the rather high operating temperatures employed, require strong and expensive autoclaves and auxiliary equipment. In addition to loss of charge through decarboxylation, a considerable portion of the alkali metal phthalate disproportionates under the reaction conditions employed with the production of benzoic acid plus benzene tricarboxylic acids such as trimesic acid. Since a considerable portion of the alkali metal phthalate charge is lost by decarboxylation and another considerable portion of the charge is lost by disproportionation, the yield of the desired alkali metal terephthalate is quite low and unsatisfactory.

Because of the severe operating conditions required and the low and generally unsatisfactory yields of the desired alkali metal terephthalate resulting, as far as the present applicant is aware the above described isomerization procedure has never been employed commercially.

I have found that heating an aromatic polycarboxylic acid (in the form of an alkali metal salt thereof) in admixture with an alkali metal alkyl carbonate results in the isomerization of the polycarboxylic acid. The presence of the alkali metal alkyl carbonate in the reaction mixture tends to suppress the decarboxylation and disproportionation of the aromatic polycarboxylic acid and as a result the aromatic polycarboxylic charge is converted to a good and satisfactory yield of an isomerization mixture of aromatic polycarboxylic acids in approximately equilibrium proportions.

A principal object of this invention is to provide an improved process for the isomerization of aromatic polycarboxylic acids.

Another object of this invention is to provide an improved process for the isomerization of aromatic dicarboxylic acids.

A further object of this invention is to provide an improved process for the isomerization of benzene dicarboxylic acids.

An additional object of this invention is to provide an improved process for the isomerization of phthalic acid to terephthalic acid.

Other objects of this invention will become apparent as the description thereof proceeds.

Alkali metal alkyl carbonates which are employed in the isomerization process of this invention are readily prepared by the action of carbon dioxide on an alkali metal alkoxide. As an example of such a procedure, a solution containing about 16.5% by weight sodium ethylate is prepared by the gradual addition of one gram mole metallic sodium to half a liter of absolute ethanol. This solution is then treated with at least the stoichiometric amount of carbon dioxide which results in the precipitation of the desired sodium ethyl carbonate. On the laboratory scale the conversion of the sodium ethylate to sodium ethyl carbonate is readily and conveniently accomplished by the gradual addition of an excess of finely divided solid carbon dioxide to the solution of sodium ethylate in absolute alcohol. Alkali metal alkyl carbonates are practically insoluble in alcohols and accordingly, as previously indicated, the preparative procedure described gives rise to a suspension of the alkali metal alkyl carbonate in the corresponding alcohol. This suspension may be used directly in the isomerization reaction of this invention, it not being necessary to separate the alkali metal alkyl carbonate from the alcohol as a distinct step of the preparative procedure.

If desired, alkali metal alkyl carbonates may be made in the "dry" way. Thus, solid sodium alkoxides may be prepared by the interaction of an alcohol vapor with molten sodium following which the sodium alkoxide, in finely divided form, is allowed to interact with gaseous carbon dioxide to form the solid sodium alkyl carbonate which may be used in solid form in the reaction of this invention or may be suspended in an inert solvent (e.g. an alcohol) before being employed in the isomerization reaction.

While this invention is described exclusively in connection with the employment of alkali metal ethyl carbonates in the practice thereof it is not limited thereto. Other alkali metal alkyl carbonates, such as alkali metal methyl carbonates, alkali metal isopropyl carbonates, and the like are the full equivalents of alkali metal ethyl carbonates in the practice of this invention.

For the better understanding of this invention the following illustrative but non-limiting examples thereof are given.

Example 1

A reaction vessel provided with a short distillation column is charged with a slurry of one mole sodium ethyl carbonate in ethyl alcohol, the solids content of said slurry being just under 25% by weight. One mole potassium phthalate is then added and the resulting mixture is slowly heated to a temperature of about 100° C., the ethyl alcohol being recovered through the column. When this alcohol has been eliminated, the exit from the reactor through the column is closed off and the dry residue in the reactor is gradually brought to a temperature of 350° C. over a period of two to three hours. During this time the reactor may be vented if necessary to maintain the pressure therein at some convenient level, say ten atmospheres gage.

After the reaction mixture has been brought to a temperature of 350° C. as described, any residual pressure in the reactor is vented to atmosphere and the reactor and its contents are cooled to below 100° C. Sufficient hot water is added to the reactor to dissolve all of the solids therein with the exception of a small amount of dark colored decomposition products usually produced and the resulting solution is filtered. The filtrate is made strongly acid (Congo red paper) with 2 N hydrochloric acid and then cooled. The precipitated acids are separated by filtration and washed with a small amount of cold water.

The resulting mixture of acids was here separated as completely as possible by fractional crystallization. The separations were based on the fact that phthalic acid is very soluble in hot water while terephthalic acid is only slightly soluble in hot water and further on the fact that terephthalic acid is essentially insoluble in cold water while phthalic acid is very slightly soluble therein.

A little more than 0.27 mole terephthalic acid was recovered together with 0.60 mole unchanged phthalic acid. Only traces of isophthalic acid were found.

Since the isomerization reaction results in the production of only traces of isophthalic acid a convenient separation of phthalic acid from terephthalic acid may be based upon the anhydride forming ability of phthalic acid. The previously described mixture of acids recovered from the isomerization reaction product is slowly heated to about 200° C. and then held at this temperature until conversion of phthalic acid to phthalic anhydride is complete (about 4 hours). During the heating and the dehydration reaction period water vapors evolved are allowed to escape from the heated mixture. After conversion to phthalic anhydride is complete, the pressure above the mixture is slowly and carefully reduced to about 25 mm. mercury following which the phthalic anhydride is removed by distillation. The distillation residue consists of the terephthalic acid product together with any traces of isophthalic acid formed during the isomerization reaction.

Example 2

The general procedure described in Example 1 was repeated with the exception that in the present example one mole potassium ethyl carbonate was substituted for the mole of sodium ethyl carbonate employed in Example 1.

The reaction product of the present example yielded aproximately 0.51 mole terephthalic acid and 0.40 mole phthalic acid with only traces of isophthalic acid.

The isomerization reaction of this invention may be conducted in the approximate temperature range 250 to 400° C. As usual, the velocity of the isomerization reaction increases with temperature but as the reaction temperature is increased appreciably above 400° C. decarboxylation and disproportionation of the aromatic polycarboxylic acid charge begins to become manifest and becomes increasingly important with further increases in reaction temperature. On the other hand, at a reaction temperature appreciably below 250° C. the reaction velocity is so low that an inordinately long reaction time is necessary to achieve a reasonable extent of conversion. All points of view considered, a reaction temperature in the approximate range 325 to 375° C. appears best and accordingly is preferred.

While this invention has been described in connection with the isomerization of alkali metal phthalates it is not limited thereto. By the process of this invention it is possible to isomerize the alkali metal salts of aromatic polycarboxylic acids in general. Thus, the benzene tricarboxylic acids may be isomerized in accordance with the process of this invention. Here the equilibrium isomerization mixture comprises principally trimesic acid (symmetrical benzene tricarboxylic acid). Accordingly, the process of this invention furnishes a convenient method for the conversion of hemimellitic acid and trimellitic acid to trimesic acid. Likewise, the naphthalene dicarboxylic acids similarly may be isomerized in accordance with the process of this invention. With naphthalene dicarboxylic acids the equilibrium mixture comprises principally naphthalene 2,6-dicarboxylic acid and accordingly the process of the invention provides a convenient method for the conversion of other naphthalene dicarboxylic acids (e.g., naphthalene 1,8-dicarboxylic acid, naphthalic acid) to naphthalene 2,6-dicarboxylic acid.

Be it remembered that while this invention has been described in connection with specific details and specific embodiments thereof, these details and embodiments are illustrative only and are not to be considered limitations on the spirit and scope of said invention except in so far as these may be incorporated in the appended claims.

I claim:

1. The isomerization process comprising heating in the approximate temperature range 250–450° C. an alkali metal salt of an organic acid selected from the group consisting of phthalic acid, hemimellitic acid and trimellitic acid in admixture with an alkali metal alkyl carbonate, said alkyl group containing one to three carbon atoms.

2. The isomerization process comprising heating in the approximate temperature range 250–450° C. the sodium salt of an organic acid selected from the group consisting of phthalic acid, hemimellitic acid and trimellitic acid in admixture with a sodium alkyl carbonate, said alkyl group containing one to three carbon atoms.

3. The isomerization process comprising heating in the approximate temperature range 250–450° C. the sodium salt of an organic acid selected from the group consisting of phthalic acid, hemimellitic acid and trimellitic acid in admixture with sodium ethyl carbonate.

4. The isomerization process comprising heating in the approximate temperature range 250–450° C. the potassium salt of an organic acid selected from the group consisting of phthalic acid, hemimellitic acid and trimellitic acid in admixture with a sodium alkyl carbonate, said alkyl group containing one to three carbon atoms.

5. The isomerization process comprising heating in the approximate temperature range 250–450° C. the potassium salt of an organic acid selected from the group consisting of phthalic acid, hemimellitic acid and trimellitic acid in admixture with sodium ethyl carbonate.

6. The isomerization process comprising heating in the approximate temperature range 250–450° C. the potassium salt of an organic acid selected from the group consisting of phthalic acid, hemimellitic and trimellitic acid in admixture with a potassium alkyl carbonate, said alkyl group containing one to three carbon atoms.

7. The isomerization process comprising heating in the approximate temperature range 250–450° C. the potassium salt of an organic acid selected from the group consisting of phthalic acid, hemimellitic acid and trimellitic acid in admixture with potassium ethyl carbonate.

8. The isomerization process comprising heating in the approximate temperature range 250–400° C. an alkali metal phthalate in admixture with an alkali metal alkyl carbonate, said alkyl group containing one to three carbon atoms.

9. The isomerization process comprising heating in the approximate temperature range 250–400° C. sodium phthalate in admixture with a sodium alkyl carbonate, said alkyl group containing one to three carbon atoms.

10. The isomerization process comprising heating in the approximate temperature range 250–400° C. sodium phthalate in admixture with sodium ethyl carbonate.

11. The isomerization process comprising heating in the approximate temperature range 250–400° C. potassium phthalate in admixture with a sodium alkyl carbonate, said alkyl group containing one to three carbon atoms.

12. The isomerization process comprising heating in the approximate temperature range 250–400° C. potassium phthalate in admixture with sodium ethyl carbonate.

13. The isomerization process comprising heating in the approximate temperature range 250–400° C. potassium phthalate in admixture with a potassium alkyl carbonate, said alkyl group containing one to three carbon atoms.

14. The isomerization process comprising heating in the approximate temperature range 250–400° C. potassium phthalate in admixture with potassium ethyl carbonate.

References Cited in the file of this patent

UNITED STATES PATENTS

| | | |
|---|---|---|
| 2,863,913 | Raecke et al. | Dec. 9, 1958 |
| 2,930,813 | Shenk et al. | Mar. 29, 1960 |

FOREIGN PATENTS

| | | |
|---|---|---|
| 936,036 | Germany | Dec. 1, 1955 |
| 1,026,300 | Germany | Mar. 20, 1958 |

OTHER REFERENCES

Ogata et al.: "J. Am. Chem. Soc.," 1957, vol. 79, pp. 6005–6008. (Available in Scientific Library.)